United States Patent [19]

Mathur et al.

[11] Patent Number: 5,625,552
[45] Date of Patent: Apr. 29, 1997

[54] CLOSED LOOP NEURAL NETWORK AUTOMATIC TUNER

[76] Inventors: Anoop K. Mathur, 4341 Rustic Pl., Shoreview, Minn. 55126; Tariq Samad, 5212 Xerxes Ave. South, Minneapolis, Minn. 55410

[21] Appl. No.: 502,016

[22] Filed: Jul. 13, 1995

Related U.S. Application Data

[63] Continuation of Ser. No. 227,227, Apr. 13, 1994, abandoned, which is a continuation of Ser. No. 809,903, Dec. 18, 1991, abandoned.

[51] Int. Cl.$^6$ .................................................... G05B 13/02
[52] U.S. Cl. .......................... 364/162; 364/157; 395/903
[58] Field of Search ................................... 364/148–151, 364/158–164, 157; 395/21–24, 81, 94, 903–906

[56] References Cited

U.S. PATENT DOCUMENTS

| | | | |
|---|---|---|---|
| 5,111,531 | 5/1992 | Grayson et al. | 364/162 |
| 5,153,807 | 10/1992 | Saito et al. | 364/162 |
| 5,159,660 | 10/1992 | Lu et al. | 364/148 |
| 5,175,678 | 12/1992 | Frerichs et al. | 364/148 |
| 5,311,421 | 5/1994 | Nomura et al. | 364/157 |

OTHER PUBLICATIONS

Ruano et al, "A Neural Network Controller", 1992, Abstract and p. 27–32.
Cheung et al, "Using A Neural Network As A Feedback Controller", 1990, Abstract & pp. 752–755 v. 2.
Swiniarski, "Novel Neural Network Based Self–Tuning PID Controller Which Uses Pattern Recog. Technique", 1990, 3023–3024 v. 3.
Swiniarski, "Neural Network Based Self–Tuning PID Controller with Fourier Transformation of Temporal Patterns", 1990, pp. 1227–1232 v. 2.
Mendel, "A Survey of Learning Control Systems", 1966, pp. 297–303. (ISA Transactions, v. 5, No. 3).
Guez et al, "Neural Network Architecture for Control", 1988, pp. 22–25 (IEEE Control Systems Magazine).
Chu et al, "Neural Networks for System Identification", 1990 (Apr.), pp. 31–34.

*Primary Examiner*—Reba I. Elmore
*Assistant Examiner*—Steven R. Garland

[57] ABSTRACT

A closed loop neural network based autotuner develops optimized proportional, integral and/or derivative parameters based on the outputs of other elements in the loop. Adjustments are initiated by making a step change in the setpoint which may be done by a user or automatically. A Smith predictor may also be employed.

4 Claims, 6 Drawing Sheets

CLOSED LOOP NEURAL NETWORK AUTOMATIC TUNER

This application is a continuation, of application Ser. No. 08/227,227, filed Apr. 13, 1994, now abandoned, which is a continuation, of application Ser. No. 07/809,903, filed Dec. 18, 1991, now abandoned.

This invention relates to the field of tuners for controllers and has particular application to closed loop autotuners for adaptive proportional integral and proportional integral derivative (PID) controllers.

BACKGROUND

In innumerable situations, it is important to have the output of some "process" (e.g., the temperature in a room, the quality of a product being manufactured in a chemical plant, the altitude of an aircraft) conform to a specified desired value called a setpoint or reference value. This is effected by using a device called a "controller" that takes as input, typically, the error between the current process output (current room temperature, for example) and the desired process output or "setpoint" (as specified by the thermostat setting) and produces as output a control signal (a signal to the furnace that regulates fuel flow). The entire setup consisting of the controller, the process and the connections that establish the information flow, is referred to as a "control loop" and a process that is being controlled in this fashion is said to be under closed-loop control. In contrast, a process is in "open-loop" when it is given a predetermined input signal and the process output is observed without this output affecting subsequent process input. In this open-loop case, there is no regulation of process output.

Controllers of many types exist. However, the majority of all control in industrial applications is accomplished with a specific class of controllers, referred to as "PID controllers". A PID controller has three parameters: the proportional gain $K_C$, the integral gain $K_I$, and the derivative gain $K_D$. The output of a PID controller at any time is the sum of three terms: $K_C$ times the current error, $K_I$ times the accumulated (integrated) error over some past time, and $K_D$ times the current rate of change (derivative) of error. Several variations, simplifications and extensions of PID controllers exist, but the above description is sufficiently general for this discussion.

By tuning a PID controller—specifying suitable values for the three parameters—all but the most demanding processes can be adequately controlled. With all PID controllers, occasional retuning is needed: real-world processes change over time for a variety of reasons.

PID tuning is often done manually and iteratively. The process operator or control engineer varies the parameters (in a principled or ad-hoc way) until acceptable process behavior to a small change in the setpoint is achieved. This can be a prolonged exercise and it seldom results in highly accurate controller settings. "Autotuners" have therefore been developed that can, in principle at least, produce near-optimal parameter settings automatically.

Two kinds of autotuners exist. In open-loop autotuners, the process is stimulated in open-loop, without the regulating effects of the controller. The resulting process output is then analyzed to identify appropriate parameter values. Open-loop autotuners cannot be used for unstable processes, and it is in general less desirable since the process is being operated in an uncontrolled situation.

With closed-loop autotuners, the control loop is not compromised. Instead, process data is collected while the process is operating under full control.

Typically, a small change is made to the setpoint of the control loop, and the controller parameters determined on the basis of some analysis of the resulting process output. The analysis of the data is more complicated, but in most applications the complication is outweighed by the benefits of tuning in closed-loop.

In this invention, a neural network is employed to tune the process in closed loop.

In closed loop means that the tuner does not require the controller to be shut down in order to operate effectively. The process thus always remains under control.

In the article "Novel Neural Network Based Self-Tuning PID Controller" which uses pattern recognition technique by Swiniarski (see Novel Neural Network Based Self-Tuning PID Controller Which Uses Pattern Recognition Techniques, Proceedings of the American Control Conference, June 1990, Pages 3023, 3024) there is described a "neuromorphic" tuner for tuning the PID controller in open loop. It uses the open-loop Ziegler-Nichols algorithm, a heuristic procedure developed in 1942. The neural network system of Swiniarski is not designed to respond to error data.

The neural network described therein (neuromorphic tuner) stores the discrete samples of an open loop step response as a sequence of process values for time samples. The tuning is done for an open loop system, "(without regulator)". And the tuners that can be developed based on this work fall in the category of PID tuners referred to as "open-loop" tuners. Thus, the use of a neural network as proposed by Swiniarski does not take advantage of the potential for closed-loop utilization, a structure which could adjust to its own expected adjustments.

Neural networks have been described by Honeywell in the co-pending application Ser. No. 07/643,595, now abandoned, entitled "A Two-Level System Identifier" in which the process (the "system") itself is identified and the parameters are estimated and tuned for the system that is identified, and in 07/594,927, now abandoned, where a neural network is used to estimate parameters for models of a process. Also, in Neural Networks for System Identification (Chu, et al, IEEE Control Systems Magazine, April 1990, pp 31–35) a Hopfield neural network is used for parameter estimation. (The use of a Hopfield type neural network presents the obvious problem of settling time for determining output, whereas non-Hopfield networks can train entirely off-line and produce results on-line very quickly.) A relatively cost effective solution is described in this patent, which provides an autotuner of a design which is readily acceptable to the marketplace at the present time because of its reliance on "PID" type tuning as opposed to tuning unknown parameters of an unknown process.

In copending application (Ser. No. 07/643,595, now abandoned A Two-Level System Identifier), the system identification focus is on process parameter determination as opposed to controller parameters, as is the case with this invention.

SUMMARY OF THE INVENTION

A closed loop autotuner is described in which the setpoint input may be changed by a user or automatically changed in order to allow the autotuner to adjust the proportional integral and/or derivative control constants of a PID controller.

In the preferred embodiment, the system employs a neural network for receiving the output of the process (or signal indicative thereof) and the current parameter settings of the PID controller. A Smith predictor may be employed to introduce a known lag or delay into the delivery of controller output (u, to the process) if desired. Variations may produce various combinations of proportional, integral and/or derivative parameters, singly or in combination, where such single or combination output constants are desirable. Throughout this application, and in the claims, PID refers to a family of controllers which use some combination of PID parameters.

Different methods of generating setpoint changes for the autotuner are also described.

DETAILED DESCRIPTION OF THE INVENTION

Figure 1:
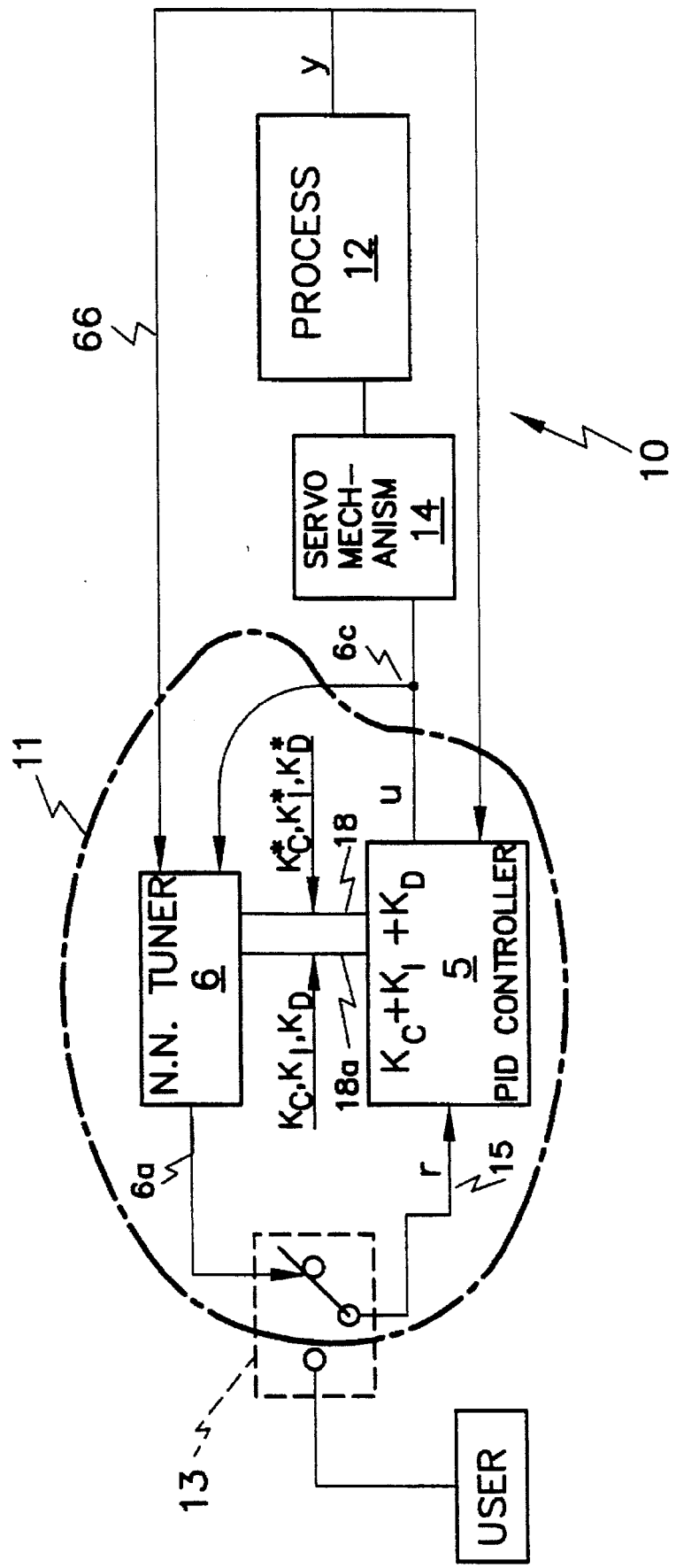
FIG. 1 is a block diagram of the autotuner as it is associated with the closed loop, including the process therein.

This invention relates to the closed loop tuning of PID controllers. Up to three constants are ordinarily specified for such controllers each time they produce output to the system or the process under control. (Such systems or processes could include a building's internal temperature state, the speed of a chemical reaction, the speed of a motor, or any other such system having either one or a multiplicity of controlled variables.) With appropriate choices of these PID parameters, most processes can be adequately controlled.

PID controllers will be used well into the next century. Most current control technology is therefore adapted to employ these PID parameters. Accordingly there is some advantage to using the PID parameters which have been used at least since Ziegler and Nichols worked with them, publishing their ideas in the 1940's.

The process of finding the appropriate or best PID constants is referred to as control loop tuning. It is desirable to accomplish the tuning in closed loop, so that the process is under control during the tuning. However, in closed-loop, the effect of the controller must be accounted for to correctly control the process, and to correctly tune the controller.

There are several closed loop tuners and tuning algorithms currently available. However, none of the PID controllers available currently are known to employ a neural network trained for closed-loop tuning.

The data required by the neural network tuner is at least the sampled process output sequence ($Y_0, Y_1, Y_2, \ldots$) under servocontrol. A process disturbance, typically a set-point change ($\Delta r$ or r), is initiated either manually or automatically. If automatically, it may be initiated by the autotuner itself, according to a program designed to generate a step change in r when there has been a long period of no setpoint change.

If desired, the program could be responsive to a large oscillation of process output levels or large fluctuations in process output, or substantial and undesirable level of overshoot, which would give an indication of a need for tuning. Creating such a program is easily within the skill of the ordinary skilled engineer in this field.

Another closed loop could also change r where the y of this process is important to that other control loop. This would be known as a "cascade" of control loops.

The sampled process output and associated (sub-optimal or current) PID parameters constitute (in one presently preferred embodiment) the input to the tuner. The output of the tuner ($K_C^*, K_I^*, K_D^*$) is a set of near-optimal tuning parameters for use by the controller. The tuning process may be repeated with the new network generated parameters becoming increasingly better than the originals. The operation of this tuner is similar to that of conventional closed loop tuners, however, the methods for arriving at PID constants are different. Most conventional tuners use human expertise, either to develop the rules of thumb, guesses, or tuning algorithms. These methods compute controller parameters based on observed changes in process output, or lack of such changes, if in open-loop, and also sometimes based on controller output in closed-loop. In contrast, in this invention, the tuning is done empirically, on the basis of optimized values generated in the training phase.

The neural network must be trained off-line to identify the control parameters. A supervised learning neural network model is employed. See, for example, the Swiniarski article cited above, or the copending applications also assigned to Honeywell, for reference. Each training example for the presently preferred embodiment must indicate as network input the controller parameter values and the resulting sampled closed loop output response values, and the corresponding desired network output value: i.e., the optimal values of the PID parameters. Several such examples must be collected for different processes and for different controller settings. The range of processes should cover the processes that the tuner will be used with. See discussion related to FIG. 4 for alternatives. The following discussion may be applied to any of them.

For training purposes, the optimal control parameters must be identified for every process used as a training example. Conventional optimization algorithms may be used in conjunction with a simulation of the closed-loop process used to generate the optimal PID parameters for this purpose. The choice of optimization criterion is a design choice and one may be picked to yield the fastest approach to setpoint, or the most cost effective, for example, as is well understood in the art. The output of the neural network in training will be compared with this optimum, and reinforced according to whichever learning rule is employed.

To be specific, it is fairly easy to use different optimization criteria for generating the training data set. Examples might be the minimum integral square error (ISE), the minimum integral times the absolute error (ITAE), and the minimum integral absolute error (IAE). The use of error based optimization criteria is not feasable for open loop tuners since no error data can be directly received by the tuner in such systems. The use of any one of these criteria, or others not mentioned here, will lead to differently trained closed-loop neural network autotuners with output optimized for the given criterion.

It is also possible to train one network with different optimization criteria. In this case, an additional network input is provided that during training indicates the criterion that was used to generate the current optimal values (the desired output network) and, during operation is used by the user to specify the criterion of current interest for autotuning.

The training data is generated in computer simulation using a mathematical model of the process controlled with a PID controller model. First, a range of processes is defined (or identified) that covers the processes for which the tuner will be used. For example, it may be desirable to have a tuner for processes that can be adequately modeled (for control purposes) as first and second order processes, with delay in which gains range from 0.1 to 10.0; time constants range from 5 to 120 sample time units, and delays range to 30 sample time units; with damping coefficients (for second order processes) between 0.4 and 0.9. The selection of the process model range can be based on the process engineer's knowledge about the typical processes in a particular area such as, for example, chemical processes. By limiting the model to such ranges, the training of the neural network will be quicker.

Closed loop process response for various PID parameters can then be simulated for the various specific processes selected. The simulation to generate training data is run in closed loop with the neural network receiving, in another preferred embodiment, the process model's output value or values, the setpoint (or reference signal) value, and the controller parameters ($K_C$, $K_I$, $K_D$). In response, the neural network produces what it believes is optimized controller PID variable values. As these optimized PID values approach the known optimum (computed by an optimization algorithm) which is paired with the input values, the neural network is increasingly better trained. When it produces the optimum output within acceptable limits, the neural network can then be placed into an actual closed-loop system.

Once the network has achieved the desired accuracy on the training data, the neural network may be programmed into a real-time controller and sold together with it as an autotuning real-time controller.

Several well known supervised learning neural network algorithms can be used in training. In our work, we have employed the well known back-propagation training algorithms, although other technologies could be used.

Neural networks may be constructed in software so that a computer system is configured as a neural network or includes a neural network as one of its processes. It may also be built in hardware. Several neural network integrated circuits are now becoming commercially available. These integrated circuits may even be programmed in groups so only one training may be required to produce an unlimited number of identically programmed or "trained" circuits. An alternative set of inputs can be used for training also, as described below.

Figure 4:
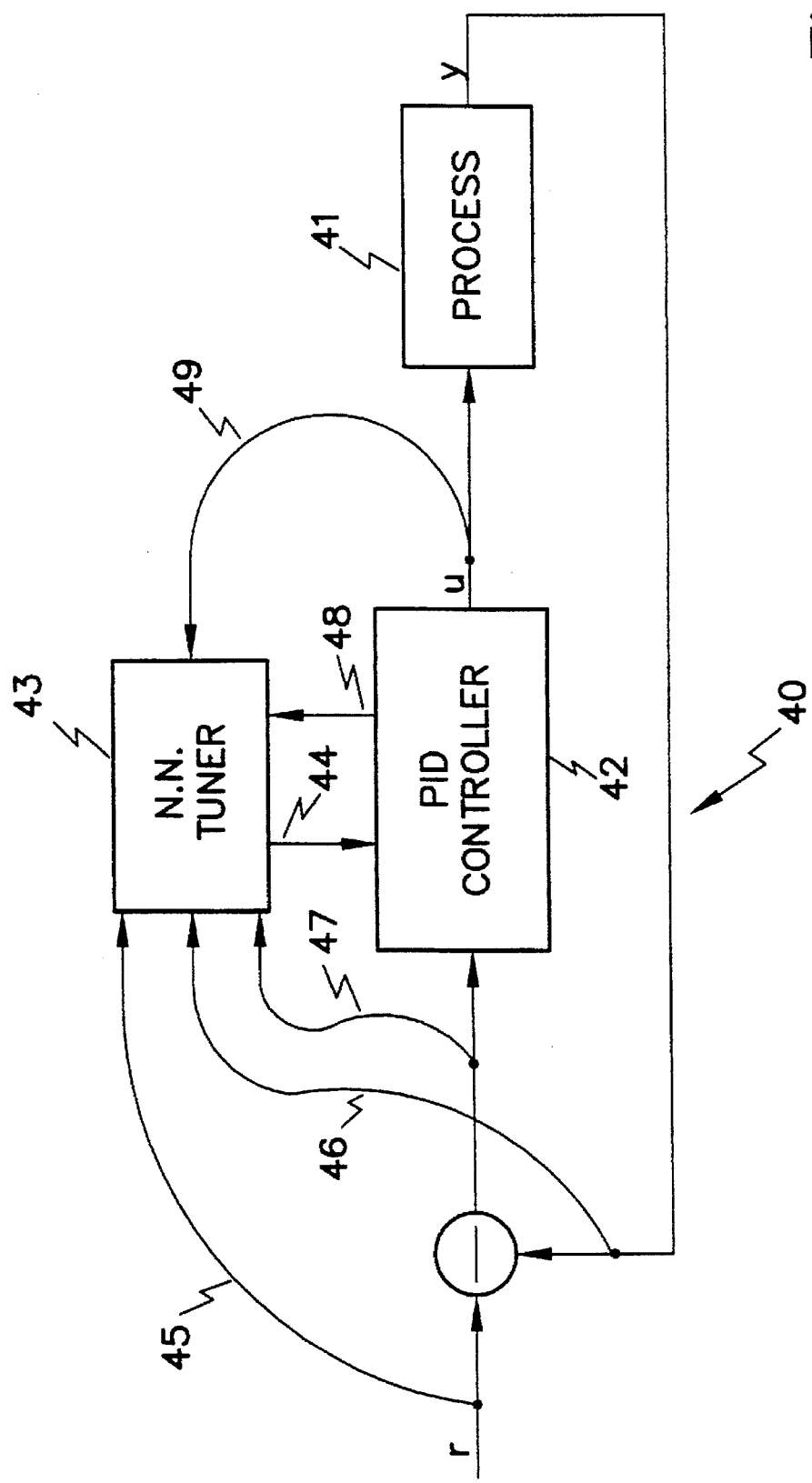
FIG. 4 is a block diagram of a controlled system detailing differing input options for the autotuner.

Referring now to FIG. 4 in which a closed-loop system 40 is shown, a process 41 is controlled by a PID controller 42 having outputs u to cause the process to generate outputs y. The PID controller has an associated neural network autotuner 43 which provides controller parameters on line 44. In this diagram, there are five inputs to the autotuner 43, inputs 45–49.

While it is not necessary to use all of the inputs 45–49 it may be desirable in some situations. In designing the neural network autotuner set of inputs of choice, many considerations come into play which are well known to designers of neural network systems. One of these is the acceptable level of relative complexity of the neural network input layer. Obviously a much larger number of input nodes is required when a larger amount of input is to be received. So for example the output of PID controller on line 48 would be only three values $K_I$, $K_D$ and $K_C$. The input into the tuner on line 49 could be a stream of one or more values of u generated by a process controller. The input for r on line 45 would be again only one value. The input on line 46 would probably also be a stream of values. The input from line 47 would be a stream of values, in all likelihood, which are the combination of the stream of y output values and r (the current setpoint value) for the error.

In deciding which inputs to accept, it should be recognized that the nature of the process 41 and the entire loop 40 should also be taken into consideration. For example, use of the set point or reference input from line 45 may not be necessary, or even useful, in processes having strictly linear responses.

One of the advantages of this invention is that no experienced process operator or control engineer is required either for the development, or for the operation of specific application controllers. Also, extensive computational and memory resources are not required, and where integrated circuit implementations of the neural network are used, with their enhanced speeds, the usefulness may be even more attractive.

Since the neural network is trained off-line and then put into the closed loop system, the training time will not be a problem for the end user of such devices and the network will supply PID values in a real time mode in operation. This could be contrasted with a Hopfield network which must resettle on each new changed input in operation, but requires no training.

Referring now to FIG. 1 in which a system 10 is shown in block diagram having a neural network autotuned controller 11 made a part thereof, the process 12 can generally be seen as producing an output "y" in response to an input "u". A control device or servomechanism 14 affects the process as illustrated here by arrow 17. The controller 5 and the neural network autotuner 6 may be, in fact, a single computer or a set of interactive software processors or hardware processors. In the preferred embodiment, a switch 13 (which could also be software or hardware) is provided to allow either a user or the autotuner 6 (through line 6a) to initiate step changes to input 15, which is the set-point or reference signal "r". In the invention, the output y is returned on line 6b to the neural network autotuner 6 and the output of the controller 5, "u" is returned on line 6c to the autotuner. The increasingly better proportional, integral and derivative signal indicators are returned on line 18a to the proportional integral derivative tuner 5. As mentioned before, the PID controller may, if desired, formulate u based on the Proportional and Integral and Derivative of the error, on the Proportional and Integral alone, or on the Proportional and Derivative of the error, and all would be "PID" controllers. It should also be noted that, if desired, the output u of the controller may not be used as a neural network input. In this form, the autotuner would need to be trained without the corresponding controller output data. The other information is in the process response (y) anyway.

Figure 2:
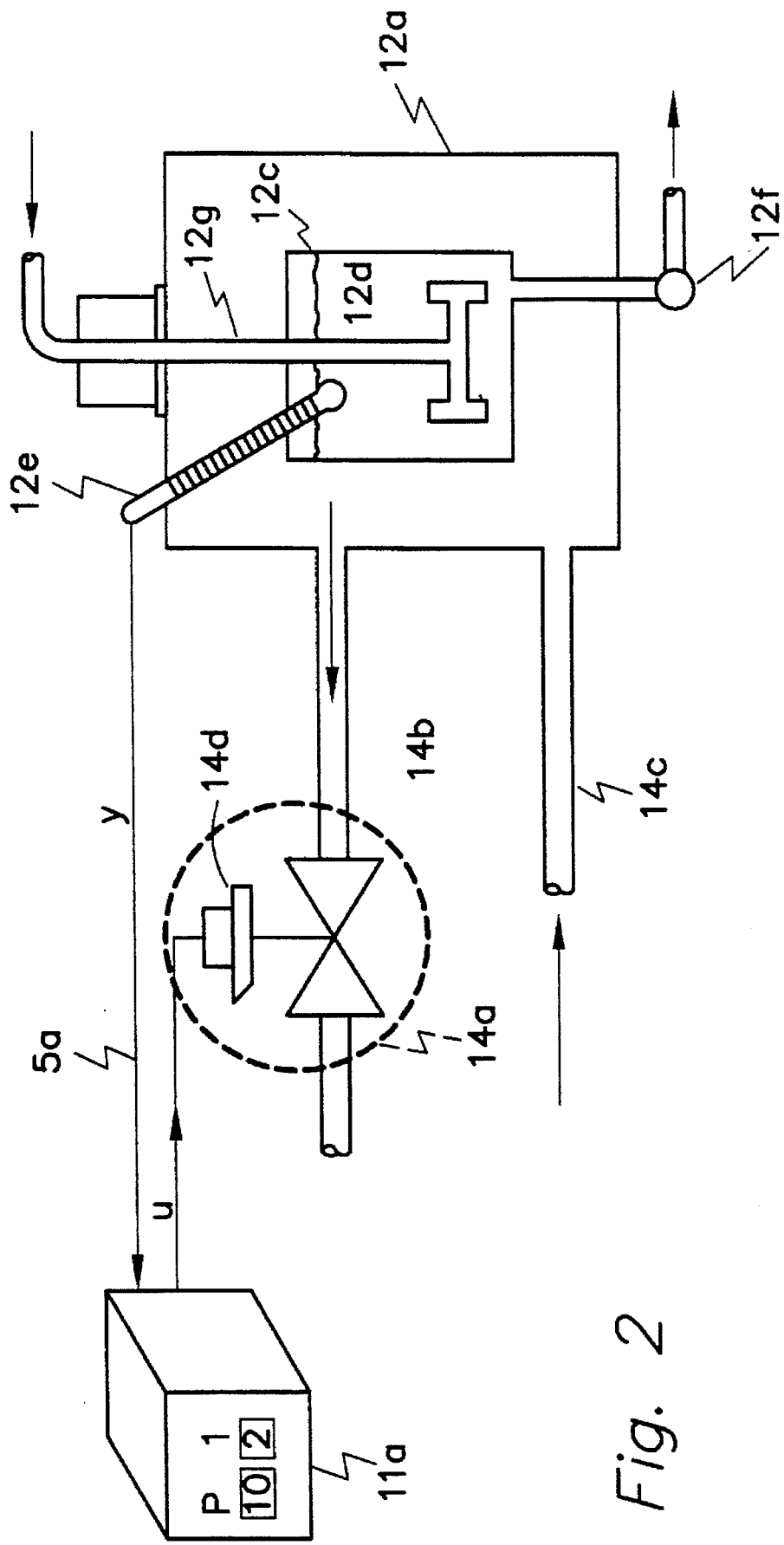
FIG. 2 is a heuristic diagram of a PID controller and process system.

Referring now to FIG. 2, a reactor vessel 12c is shown in an actual process device 12a. The control device or servomechanism in this case is a valve 14a. The valve allows coolant to flow through pipe 14b away from the reaction device 12a at a controlled rate. The coolant returns to a device through tube 14c. The valve is controlled by signals (u) which move the valve in the open or close direction. The reacting substance 12d produces heat which is measured by temperature probe 12e, returning a process output signal y to the controller with tuner 11a. The product of the reaction is removed at 12f and the input introduced through a mixing rod assembly 12g.

The plant output (here temperature or "y") also is brought to the input of the controller through line 5a. Thus, the simple case is illustrated with a change in temperature in y causing a controller response u to drive the reaction by changing the coolant release valve position to increase or decrease the coolant flow. u in this case is, therefore, an amount and vector of valve actuator 14b, the movement of which is defined as a function of $K_I$, $K_c$ by the operations within the PID controller 11a.

It is known in the art that u may be a function of the PID parameters as expressed in the equation:

$$u(s)=(K_C+K_I/s+K_Ds) E(s) \text{ or,}$$

$$u(t)=e\ K_C+K_I \int edt+K_D\ de/dt,$$

where s is the Laplace transform variable.

Figure 3:
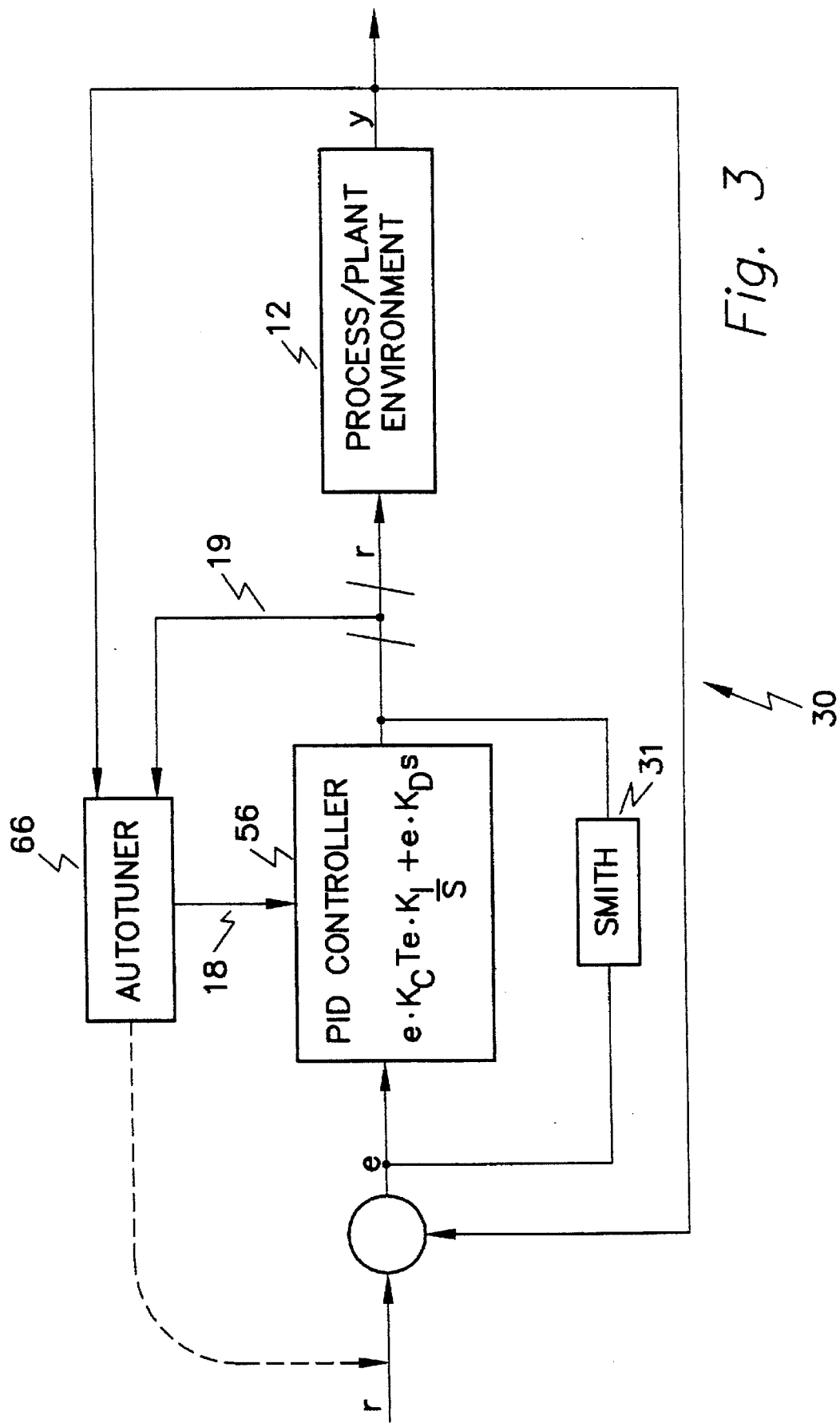
FIG. 3 is a block diagram of a controlled system with the autotuner and a Smith predictor.

Refer now to FIG. 3 in which the use of a Smith Predictor 31 is illustrated. The predictor is well known in the art and, is used to slow or speed up the response of controller output u to a new y based on a known delay parameter inherent in the system. PID controllers ordinarily do not account for delay in response, so using a Smith Predictor is one way to handle this without ignoring the PID control paradigm. Note also that there is an error signal e used here as the input to the controller 5b and no control device is specifically drawn so that u is input directly into the process 12. (Since the error is the difference between the setpoint and y, it may be used instead of y in any embodiment, so long as the neural network autotuner is trained with e instead of y.) The autotuner 6b will here again send optimized values of variables to the controller 5b. It should be noted here that the autotuner may also function adequately without input 19.

It should be noted that the neural network autotuner output can be in the form of increments to the PID coefficients (+or − some value), rather than the values of the coefficients themselves, if desired. In such cases the current $K_C$, $K_I$ and $K_D$ need not necessarily be provided as neural network input, neither during training nor operation.

Figure 6:
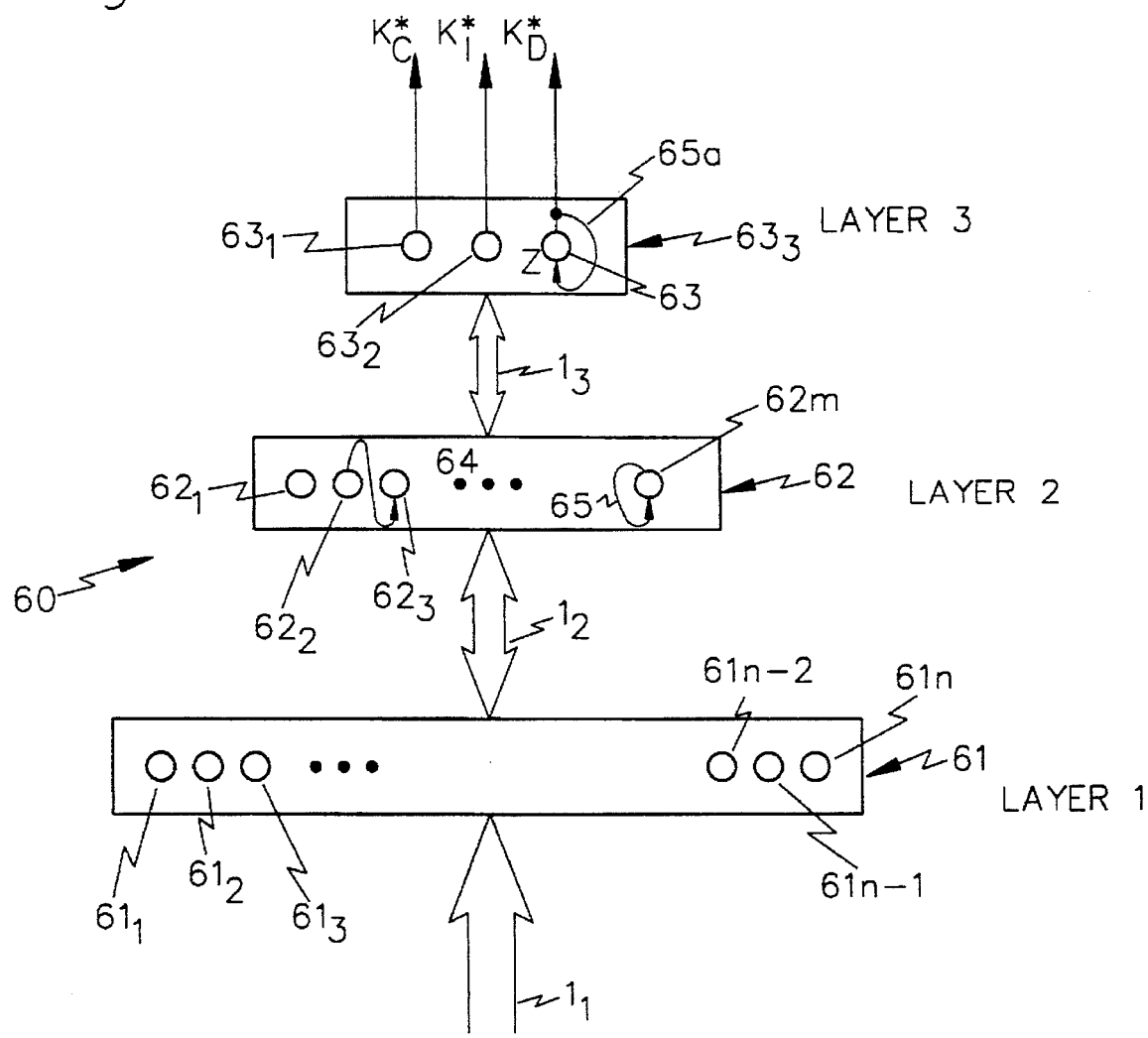
FIG. 6 is a heuristic block diagram of a neural network such as may be used in this invention.

Referring now to FIG. 6, the gross anatomy of the neural network 60 is shown to be composed of, in this case, three layers 61, 62, and 63. A set of inputs $I_1$ provides information to the first layer 61. This information can be received for example from any of the lines 45–49 (each of which may represent multiple lines). The layer has as many nodes as are desired by the designer to receive inputs from outside the neural network. These nodes in layer 61 are labelled $61_1$–$61_n$. Generally by direct connection from nodes $61_1$–$61_n$ to nodes $62_1$ to $62_m$ information will be passed into one or more middle layers also known as hidden layers like layer 62, via what here is drawn as arrow $I_2$. It should be noted that there may be propagation between nodes in a layer such as line 64 delivering output of node $62_2$ to input of $62_3$ or within a layer from one node to itself such as is illustrated by line 65 for node $62_m$. Propagation downward may also be acceptable as indicated by the bidirectional arrows $I_2$, $I_3$. It is not desired by the inventors in this patent to restrict the form of neural network available to use in the auto tuner, however this illustrative neural network 60 is merely to provide a generalized description of possible neural network anatomies. It is possible to have a single layer network in the nature of that shown by line 64 wherein some of the nodes in the single layer produce outputs such as those produced by nodes $61_1$, $61_2$ and $61_3$ from layer 63.

An arrow $I_3$ in neural network 60 illustrates heuristically a not fully described set of connections between the nodes in layer 62 and the nodes in layer 63. After having trained a neural network such as the one described with reference to FIG. 6, outputs such as $K^*_C$, $K^*_I$, and $K^*_D$ are produced in accordance with this invention.

Figure 5:
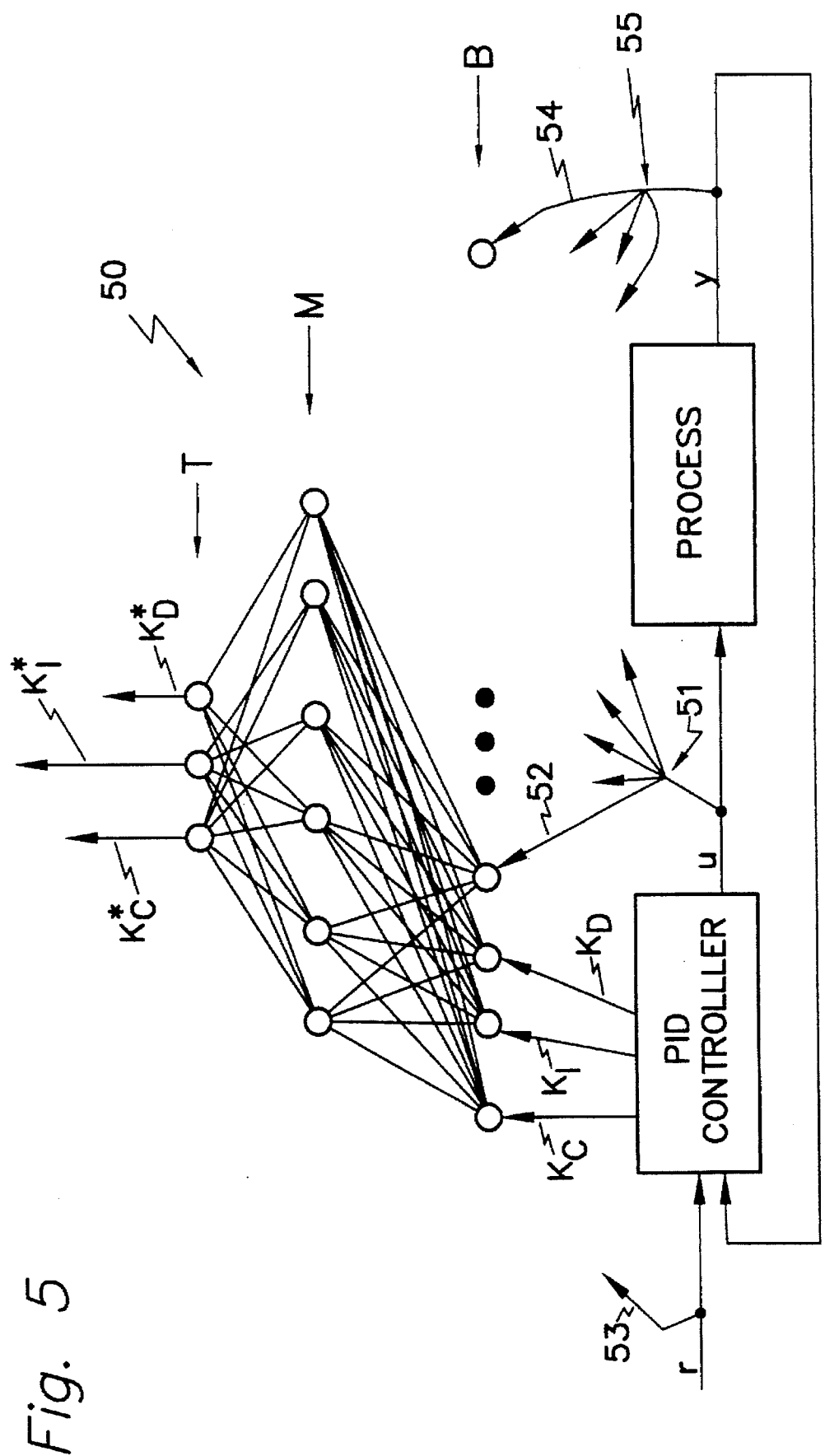
FIG. 5 is a simplified system block diagram with an expanded diagram for the neural network.

A less abstract form of a neural network system NN is seen in FIG. 5. A similar closed-loop controlled process 50 is also shown here. The outputs of the neural network $K_C^*$, $K_I^*$, and $K_D^*$, are fed back to the PID controller but these wires are not shown in this drawing. This neural network NN also has three layers. The bottom layer is fairly large and the middle layer connections to it are only shown as arrows. There is no recursive connection shown in this structure, nor feedback to the first layer, for the sake of simplicity. The controller parameters $K_C$, $K_I$, and $K_D$ are directed to three individual nodes in the bottom layer B. The output of the PID controller U is shown connected to the bottom layer B through line 52 and fanout 51. The reference signal R is sent by line 53 into the bottom layer B and one of its nodes. Likewise, the output of the process Y is sent by line 54 and fanout 55 into the bottom layer of the neural network NN.

Currently, there are neural network chips available from Intel, of Santa Clara, Calif., and other corporations. These impose some constraints on the designer of the auto tuner system regarding the number of inputs and connection patterns available. Neural networks can also be built in software and in such cases, there is virtually no restriction on the number or forms of the nodes and their connections.

What is claimed is:

1. A neural network automatic tuner for tuning a PID controller which in turn controls a system in a closed loop control system configuration, comprising:

a neural network autotuner, wherein said neural network autotuner receives a y output, representing an existing value of output of a system under control, and produces a tuner output to the PID controller of optimized PID controller parameters made up of a combination of a set of parameters including $K_I$, $K_D$ and $K_C$, wherein said set of parameters are consistent with a PID controller-based process model selected from a set of process models similar to the system under control and are also consistent with a predefined optimization criteria, or are consistent with a combination of the set of process models and the predefined optimization criteria, and wherein said PID controller parameters are applied to said PID controller to generate a new near-optimal controller output u and a new near-optimal system output y of the system, and wherein in order to initiate tuning of the set of parameters by the neural network autotuner said neural network autotuner provides a setpoint change output which adjusts a setpoint input to the system operating in closed loop configuration.

2. An autotuner as set forth in claim 1 wherein said setpoint change output from the neural network autotuner corresponds to a predetermined function of either an error signal, or a combination of the setpoint change input and the y output, or a combination of the error signal and the controller output u.

3. A closed loop control system as set forth in claim 1 prepared for use after said neural network is trained and installed in the closed loop system: wherein the neural network is trained using a plurality of preselected discrete optimization criteria, each of said plurality of preselected optimization criterion accessible for selection by an operator so that the PID controller parameters optimized for said criterion comprise the output from said neural network.

4. A closed loop control system as set forth in claim 1, wherein the tuner output from said neural network autotuner comprises the change in at least one parameter from the set of parameters including $K_C$, $K_I$ and $K_D$.

* * * * *